(12) United States Patent
Lee et al.

(10) Patent No.: US 11,683,156 B2
(45) Date of Patent: Jun. 20, 2023

(54) SECURELY RETRIEVING ENCRYPTION KEYS FOR A STORAGE SYSTEM

(71) Applicant: International Business Machines Corporation, Armonk, NY (US)

(72) Inventors: Duke Andy Lee, Tucson, AZ (US); Jeffrey Wayne Pilch, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 16/506,843

(22) Filed: Jul. 9, 2019

(65) Prior Publication Data

US 2021/0014048 A1    Jan. 14, 2021

(51) Int. Cl.
*H04L 9/08* (2006.01)
*H04L 9/40* (2022.01)

(52) U.S. Cl.
CPC ............ *H04L 9/0825* (2013.01); *H04L 9/083* (2013.01); *H04L 9/0827* (2013.01); *H04L 63/0442* (2013.01); *H04L 63/166* (2013.01)

(58) Field of Classification Search
CPC ..... H04L 9/0825; H04L 9/0827; H04L 9/083; H04L 63/0442; H04L 63/166
See application file for complete search history.

(56) References Cited

U.S. PATENT DOCUMENTS

| | | | |
|---|---|---|---|
| 7,240,366 B2 | 7/2007 | Buch et al. | |
| 8,295,492 B2 | 10/2012 | Suarez et al. | |
| 8,862,899 B2 | 10/2014 | Rastogi et al. | |
| 9,973,481 B1 * | 5/2018 | Sharifi Mehr | H04L 9/0825 |
| 10,146,629 B1 * | 12/2018 | Yadav | G06F 11/1461 |
| 10,735,193 B1 * | 8/2020 | Knas | H04L 9/0861 |
| 2003/0059053 A1 * | 3/2003 | Medvinsky | G06F 21/606 380/277 |
| 2007/0112957 A1 * | 5/2007 | Shastri | H04L 63/20 709/224 |
| 2008/0040723 A1 * | 2/2008 | Haustein | G06F 3/0611 718/104 |
| 2008/0065889 A1 * | 3/2008 | Greco | H04L 63/062 713/171 |

(Continued)

OTHER PUBLICATIONS

CSRC, "Cloud Computing," Computer Security Resource Center, Oct. 2017, 3 pages, retrieved from https://csrc.nist.gov/projects/cloud-computing.

(Continued)

*Primary Examiner* — Bassam A Noaman
(74) *Attorney, Agent, or Firm* — Zilka-Kotab, P.C.

(57) ABSTRACT

A computer-implemented method according to one embodiment includes receiving at an encryption daemon a key request from a storage device; implementing, by the encryption daemon, a secure communications channel between the encryption daemon and an encryption key server; sending the key request from the encryption daemon to the encryption key server, utilizing the secure communications channel; receiving, from the encryption key server at the encryption daemon, an encrypted response, utilizing the secure communications channel; decrypting, by the encryption daemon, the encrypted response to obtain the requested key, and sending the requested key from the encryption daemon to the storage device.

19 Claims, 9 Drawing Sheets

(56) References Cited

U.S. PATENT DOCUMENTS

| | | | | |
|---|---|---|---|---|
| 2008/0098194 A1* | 4/2008 | Hashimoto | ............ | G06F 9/5077 |
| | | | | 711/173 |
| 2009/0204964 A1* | 8/2009 | Foley | ................. | G06F 9/45558 |
| | | | | 718/1 |
| 2009/0300356 A1* | 12/2009 | Crandell | ................. | H04L 9/083 |
| | | | | 713/170 |
| 2010/0080393 A1* | 4/2010 | Feather | ................ | H04L 9/0827 |
| | | | | 380/278 |
| 2013/0159251 A1* | 6/2013 | Skrenta | .............. | G06F 16/2282 |
| | | | | 707/612 |
| 2015/0341386 A1* | 11/2015 | Bergman | .............. | H04L 63/166 |
| | | | | 726/3 |
| 2018/0013549 A1* | 1/2018 | Block | ................... | H04L 9/0894 |
| 2018/0053018 A1* | 2/2018 | Baskaran | ................ | G06F 21/78 |
| 2018/0060604 A1* | 3/2018 | Bent | .................... | H04L 9/0825 |
| 2018/0152423 A1* | 5/2018 | Dayka | .............. | H04L 9/088 |
| 2018/0247302 A1* | 8/2018 | Armstrong | .............. | G06F 21/64 |
| 2018/0331913 A1* | 11/2018 | Dasar | ...................... | H04L 63/20 |
| 2018/0367618 A1* | 12/2018 | Jolfaei | .................... | H04L 41/20 |
| 2019/0245688 A1* | 8/2019 | Patin | ...................... | H04L 9/321 |
| 2020/0053103 A1* | 2/2020 | Rehak | .................... | H04L 63/02 |

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

* cited by examiner

SECURELY RETRIEVING ENCRYPTION KEYS FOR A STORAGE SYSTEM

BACKGROUND

The present invention relates to data security, and more particularly, this invention relates to securely requesting and receiving encryption keys for use in a storage system.

Encryption keys are commonly used in storage systems to improve a security of stored data. For example, storage devices such as disk cache controllers and tape drives may securely write and read data from storage media using encryption keys. These encryption keys are retrieved from a remote server. However, current methods for retrieving such keys fail to implement security measures that prevent compromise of the encryption key during transmission.

BRIEF SUMMARY

A computer-implemented method according to one embodiment includes receiving at an encryption daemon a key request from a storage device; implementing, by the encryption daemon, a secure communications channel between the encryption daemon and an encryption key server; sending the key request from the encryption daemon to the encryption key server, utilizing the secure communications channel; receiving, from the encryption key server at the encryption daemon, an encrypted response, utilizing the secure communications channel; decrypting, by the encryption daemon, the encrypted response to obtain the requested key, and sending the requested key from the encryption daemon to the storage device.

According to another embodiment, a computer program product for securely retrieving encryption keys for a storage system includes a computer readable storage medium having program instructions embodied therewith, where the computer readable storage medium is not a transitory signal per se, and where the program instructions are executable by a processor to cause the processor to perform a method including receiving, by the processor at an encryption daemon a key request from a storage device; implementing, by the encryption daemon utilizing the processor, a secure communications channel between the encryption daemon and an encryption key server; sending, by the processor, the key request from the encryption daemon to the encryption key server, utilizing the secure communications channel; receiving, from the encryption key server at the encryption daemon utilizing the processor, an encrypted response, utilizing the secure communications channel; decrypting, by the encryption daemon utilizing the processor, the encrypted response to obtain the requested key; and sending, by the processor, the requested key from the encryption daemon to the storage device.

According to another embodiment, a computer-implemented method includes receiving at a first encryption daemon a key request from a second encryption daemon; implementing, by the first encryption daemon, a secure communications channel between the first encryption daemon and an encryption key server; sending the key request from the first encryption daemon to the encryption key server, utilizing the secure communications channel; receiving, from the encryption key server at the first encryption daemon, an encrypted response, utilizing the secure communications channel; decrypting, by the first encryption daemon, the encrypted response to obtain the requested key; and sending the requested key from the first encryption daemon to the second encryption daemon.

Other aspects and embodiments of the present invention will become apparent from the following detailed description, which, when taken in conjunction with the drawings, illustrate by way of example the principles of the invention.

DETAILED DESCRIPTION

Figure 1:
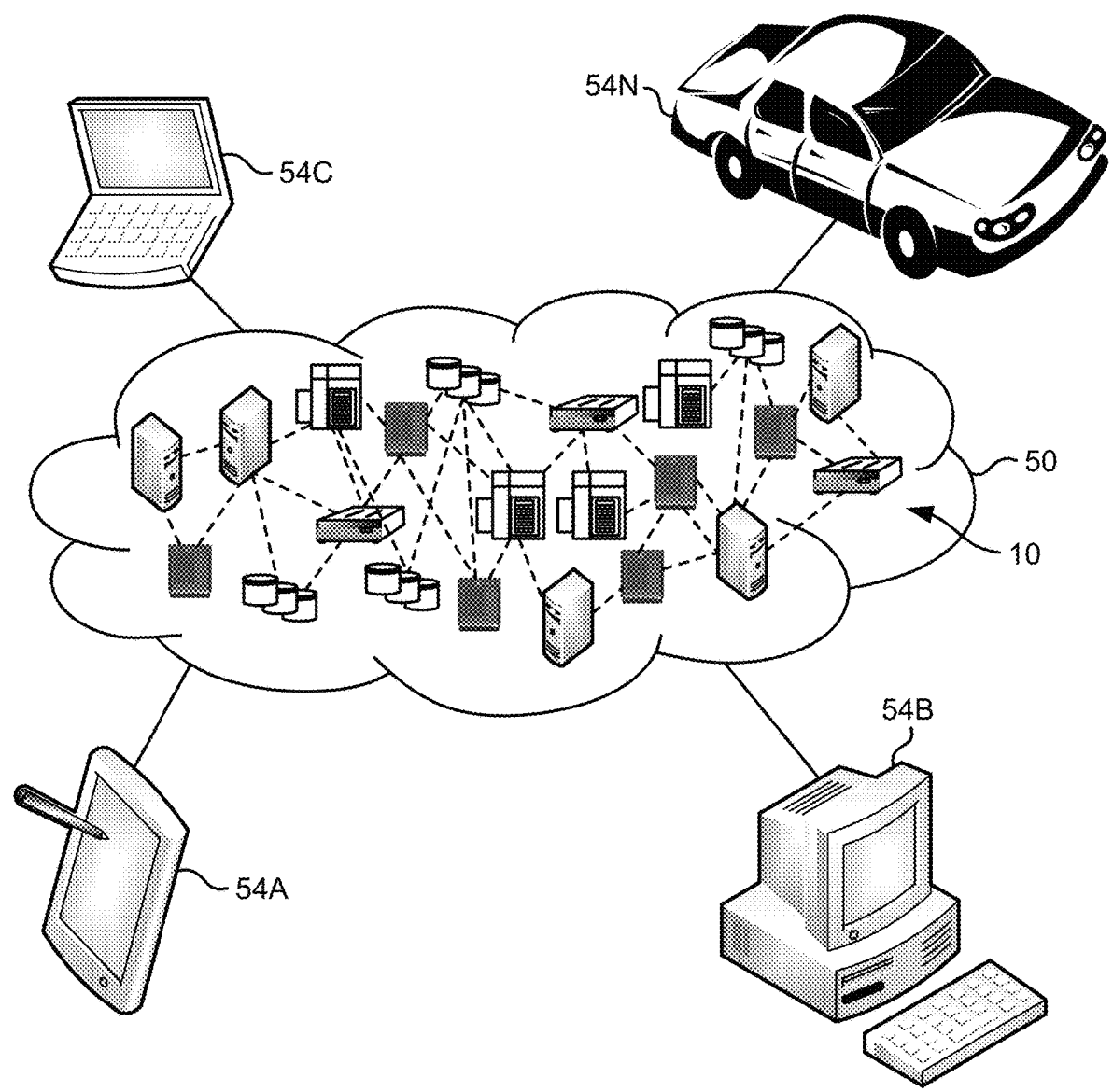
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of securely retrieving encryption keys for a storage system.

In one general embodiment, a computer-implemented method includes receiving at an encryption daemon a key request from a storage device; implementing, by the encryption daemon, a secure communications channel between the encryption daemon and an encryption key server; sending the key request from the encryption daemon to the encryption key server, utilizing the secure communications channel; receiving, from the encryption key server at the encryption daemon, an encrypted response, utilizing the secure communications channel; decrypting, by the encryption daemon, the encrypted response to obtain the requested key, and sending the requested key from the encryption daemon to the storage device.

In another general embodiment, a computer program product for securely retrieving encryption keys for a storage system includes a computer readable storage medium having program instructions embodied therewith, where the computer readable storage medium is not a transitory signal per se, and where the program instructions are executable by a processor to cause the processor to perform a method including receiving, by the processor at an encryption daemon a key request from a storage device; implementing, by the encryption daemon utilizing the processor, a secure communications channel between the encryption daemon and an encryption key server; sending, by the processor, the key request from the encryption daemon to the encryption key server, utilizing the secure communications channel; receiving, from the encryption key server at the encryption daemon utilizing the processor, an encrypted response, utilizing the secure communications channel; decrypting, by the encryption daemon utilizing the processor, the encrypted response to obtain the requested key; and sending, by the processor, the requested key from the encryption daemon to the storage device.

In another general embodiment, a computer-implemented method includes receiving at a first encryption daemon a key request from a second encryption daemon; implementing, by the first encryption daemon, a secure communications channel between the first encryption daemon and an encryption key server; sending the key request from the first encryption daemon to the encryption key server, utilizing the secure communications channel; receiving, from the encryption key server at the first encryption daemon, an encrypted response, utilizing the secure communications channel; decrypting, by the first encryption daemon, the encrypted response to obtain the requested key; and sending the requested key from the first encryption daemon to the second encryption daemon.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
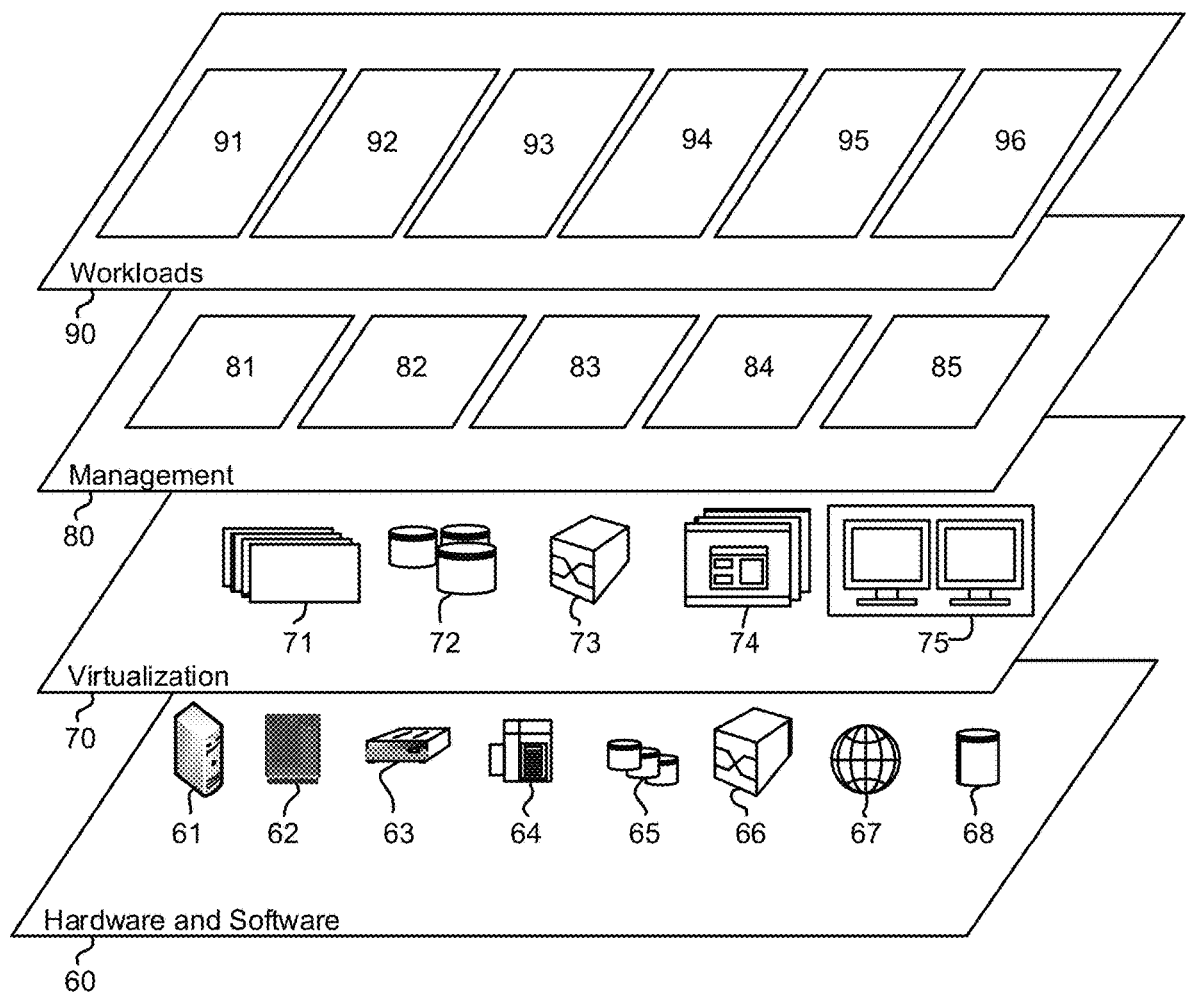
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encryption key transmission 96.

Figure 3:
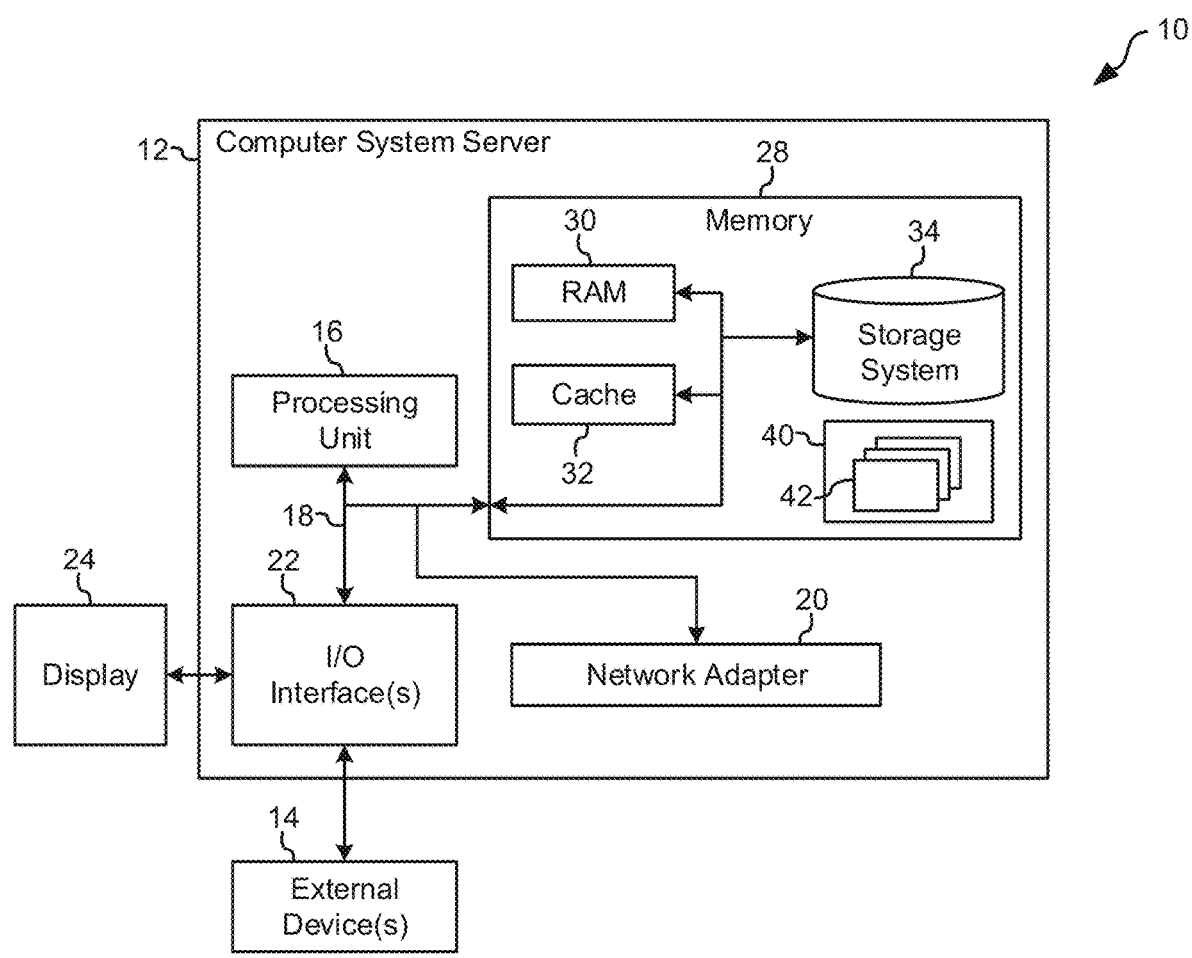
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
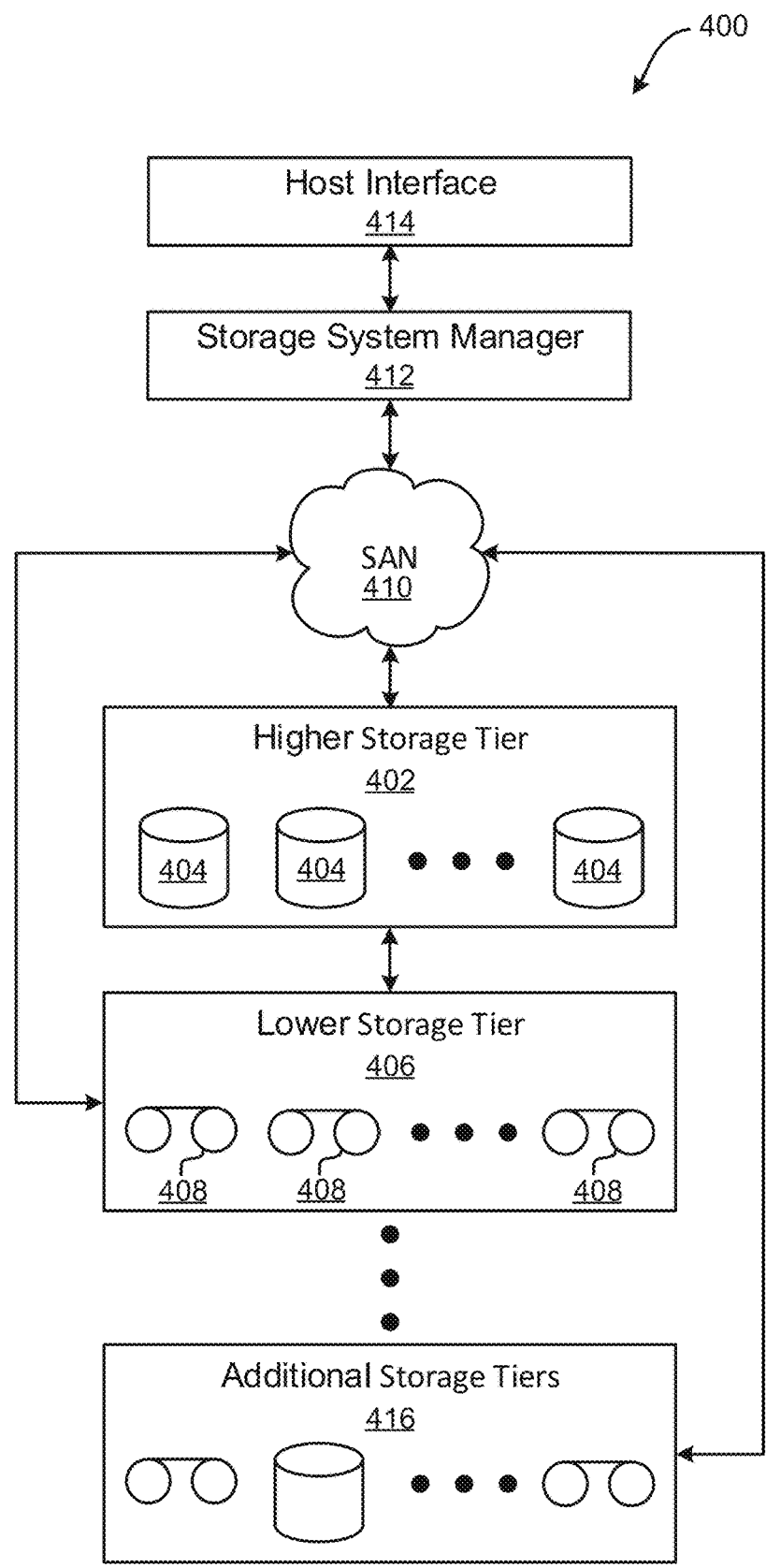
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
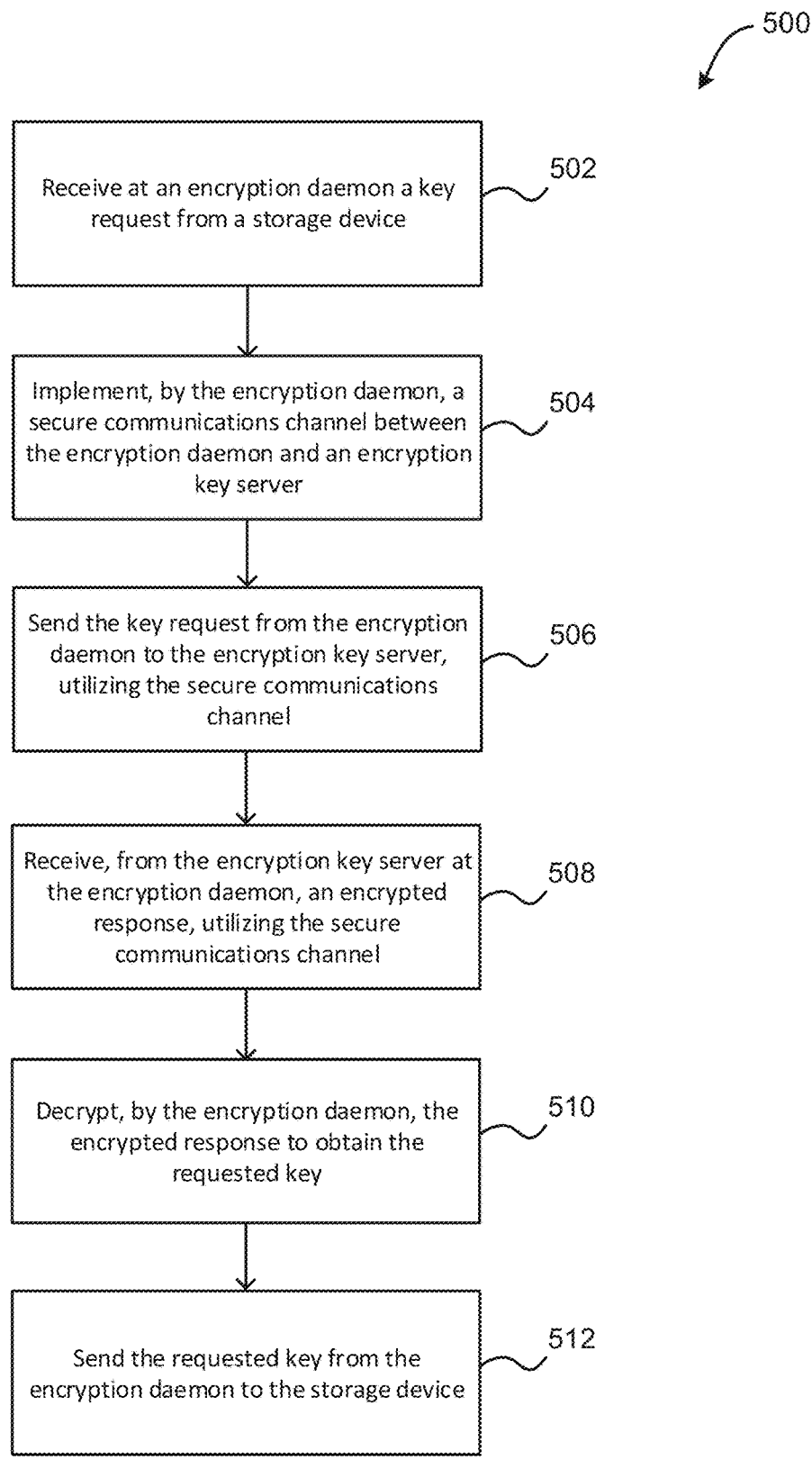
FIG. 5 illustrates a flowchart of a method for securely retrieving encryption keys for a storage system, in accordance with one embodiment of the present invention.

Now referring to FIG. 5, a flowchart of a method 500 is shown according to one embodiment. The method 500 may be performed in accordance with the present invention in any of the environments depicted in FIGS. 1-4 and 7-9, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a key request is received at an encryption daemon from a storage device. In one embodiment, the storage device may include any device that performs data storage and retrieval operations. For example, the storage device may include a physical tape drive. In another example, the storage device may include a portion of a tape library. In yet another example, the storage device may include a disk cache controller that controls data writes and reads to one or more hard disk drives.

Additionally, in one embodiment, the key request may include a request for an encryption key. For example, the encryption key may be used by the storage device to encrypt data to be written to the storage device. In another example, the encryption key may be used by the storage device to decrypt data to be read from the storage device. In yet another example, the encryption key may be linked to a predetermined user, predetermined data, etc.

Further, in one embodiment, the key request may be received from the storage device using a hardwired connection (e.g., a hardwired fiber channel path, etc.). In another embodiment, the key request may be received from the storage device using an internal network connection (e.g., an internal Ethernet network connection, etc.). For example, the internal network connection may implement a secure communications protocol (e.g., TLS encryption, etc.) to send the request from the storage device to the encryption daemon.

Further still, in one embodiment, the encryption daemon may include an appliance that includes both hardware and software. In another embodiment, the encryption daemon may run on a standalone device (e.g., a server, etc.). In yet another embodiment, the encryption daemon may be implemented with the storage device within a storage system. For example, the storage system may be one of a plurality of storage systems within a storage infrastructure (e.g., a storage matrix, etc.). In another example, the storage system may provide cloud-based storage to one or more clients.

Also, in one embodiment, the encryption daemon may assist in the implementation of the storage device. For example, the encryption daemon may provide requested keys to the storage device in order to facilitate the storage of data within the storage device. In another embodiment, the key request may be intercepted by the encryption daemon. For example, the storage device may send the key request to an encryption key server, and the encryption daemon may intercept such request.

In addition, method 500 may proceed with operation 504, where a secure communications channel is implemented between the encryption daemon and an encryption key server. In one embodiment, the encryption key server may include one of a plurality of encryption key servers in communication with the encryption daemon. In another embodiment, the encryption key server may communicate with the encryption daemon over an external network (e.g., an external Ethernet network connection, etc.).

Furthermore, in one embodiment, the encryption key server may be external from a storage system that includes the encryption daemon. In another embodiment, implementing the secure communications channel may include spawning, by the encryption daemon, a new thread to manage the received key request.

Further still, in one embodiment, implementing the secure communications channel may include performing, by the encryption daemon, a Transport Layer Security (TLS) handshake with the encryption key server. For example, the spawned thread may manage the TLS handshake and subsequent secure data transfer. In another example, the TLS handshake may establish the secure communications channel and associated protocols between the encryption daemon and the encryption key server.

Also, method 500 may proceed with operation 506, where the key request is sent from the encryption daemon to the encryption key server, utilizing the secure communications channel. In one embodiment, the encryption daemon may encrypt the key request to create an encrypted key request, utilizing a public key for the encryption key server. For example, the public key may include a public encryption key used to encrypt data for secure transmission.

Additionally, in one embodiment, the public key for the encryption key server may be requested and retrieved by the encryption daemon before the encryption daemon receives the key request from the storage device. For example, the encryption daemon may confirm/verify the identity of the encryption key server prior to requesting the public key for the encryption key server.

Further, in one embodiment, if the encryption daemon is in communication with a plurality of different encryption key servers, the encryption daemon may request and obtain public keys for each of the different encryption key servers. In another embodiment, the encryption daemon may send the encrypted key request to the encryption key server, utilizing the established secure communications channel. For example, the encryption daemon may send the encrypted key request to the encryption key server utilizing a TLS protocol.

Further still, method 500 may proceed with operation 508, where an encrypted response is received from the encryption key server at the encryption daemon, utilizing the secure communications channel. In one embodiment, the encryption key server may decrypt the encrypted key request utilizing a private key corresponding to the public key used to encrypt the request. In another embodiment, the encryption key server may identify and retrieve the requested key, utilizing the decrypted request.

Also, in one embodiment, the encryption key server may encrypt the requested key to create an encrypted response, utilizing a public key for the encryption daemon. In another embodiment, the public key for the encryption daemon may be previously requested and retrieved by the encryption key server. For example, the encryption key server may confirm/verify the identity of the encryption daemon prior to requesting the public key for the encryption daemon.

In addition, in one embodiment, if the encryption key server is in communication with a plurality of different encryption daemons, the encryption key server may request and obtain public keys for each of the different encryption daemons. In another embodiment, the encryption key server may send the encrypted response to the encryption daemon, utilizing the established secure communications channel. For example, the encryption key server may send the encrypted response to the encryption daemon utilizing a TLS protocol.

Furthermore, method 500 may proceed with operation 510, where the encrypted response is decrypted by the encryption daemon to obtain the requested key. In one embodiment, the encryption daemon may decrypt the encrypted response utilizing a private key corresponding to the public key used to encrypt the encrypted response. In another embodiment, the encrypted response may include the requested key that has been encrypted by the encryption key server. For example, decrypting the encrypted response may therefore yield the requested key.

Further still, method 500 may proceed with operation 512, where the requested key is sent from the encryption daemon to the storage device. In one embodiment, the requested key may be sent to the storage device using a hardwired connection. In another embodiment, the requested key may be sent to the storage device using an internal network connection. For example, the internal network connection may implement a secure communications protocol to send the requested key.

In this way, the encryption daemon may securely request and receive an encryption key from an encryption key server external from a storage system. This may eliminate security threats to the storage system caused by unsecure encryption key transactions, and may therefore improve the overall security posture of the storage system.

Figure 6:
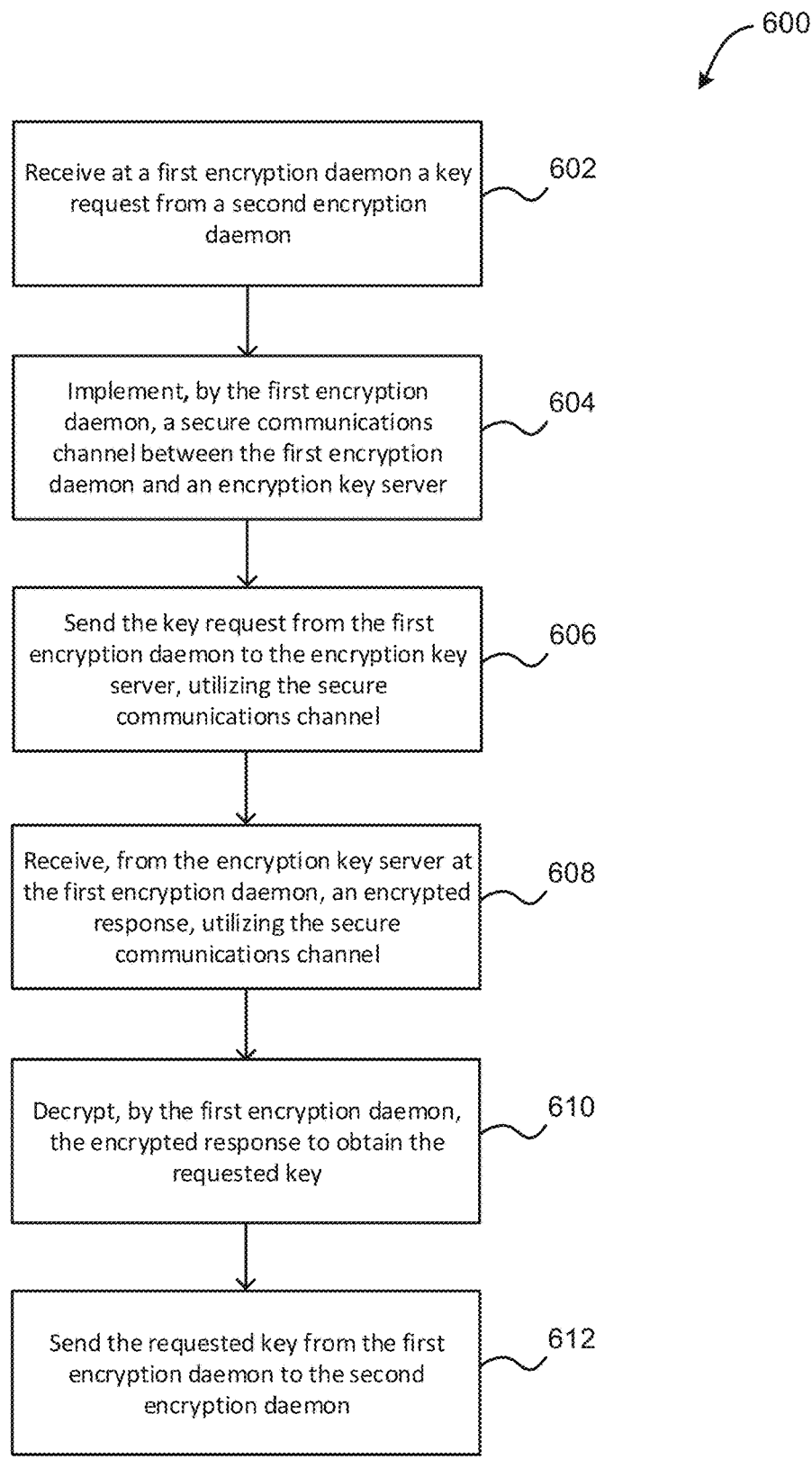
FIG. 6 illustrates a flowchart of a method for securely retrieving keys in a distributed storage system, in accordance with one embodiment of the present invention.

Now referring to FIG. 6, a flowchart of a method 600 for securely retrieving keys in a distributed storage system is shown according to one embodiment. The method 600 may be performed in accordance with the present invention in any of the environments depicted in FIGS. 1-4 and 7-9, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a key request is received at a first encryption daemon from a second encryption daemon. In one embodiment, the first encryption daemon may be implemented within a first storage system, and the second encryption daemon may be implemented within a second storage system separate from the first storage system. In another embodiment, the first storage system and the second storage system may be included within a single distributed storage system environment.

Additionally, in one embodiment, the first encryption daemon may be capable of establishing a secure communications channel with an encryption key server. In another embodiment, the second encryption daemon may be unable to establish a secure communications channel with an encryption key server. In yet another embodiment, the second encryption daemon may receive and/or intercept the key request from a storage device (e.g., a storage device located within the second storage system, etc.). For example, the storage device may send the key request to an encryption key server, and the second encryption daemon may intercept such request.

Further, in one embodiment, in response to determining that the second encryption daemon cannot establish a secure communications channel with the encryption key server, the second encryption daemon may relay the key request to the first encryption daemon. In another embodiment, the key request may be sent to the first encryption daemon using a hardwired connection between the first encryption daemon and the second encryption daemon.

Further still, in one embodiment, the key request may be sent to the first encryption daemon using an internal network connection between the first encryption daemon and the second encryption daemon. In another embodiment, the internal network connection may implement a secure communications protocol to send the key request.

Also, method 600 may proceed with operation 604, where a secure communications channel is implemented between the first encryption daemon and an encryption key server. In addition, method 600 may proceed with operation 606, where the key request is sent from the first encryption daemon to the encryption key server, utilizing the secure communications channel. Furthermore, method 600 may proceed with operation 608, where an encrypted response is received from the encryption key server at the first encryption daemon, utilizing the secure communications channel.

Further still, method 600 may proceed with operation 610, where the encrypted response is decrypted by the first encryption daemon to obtain the requested key. Also, method 600 may proceed with operation 612, where the requested key is sent from the first encryption daemon to the second encryption daemon. In one embodiment, the second encryption daemon may then provide the requested key to the storage device that requested it.

In this way, a single daemon with a secure key retrieval connection can act on behalf of other daemons to retrieve and distribute security keys to a plurality of different storage systems.

Figure 7:
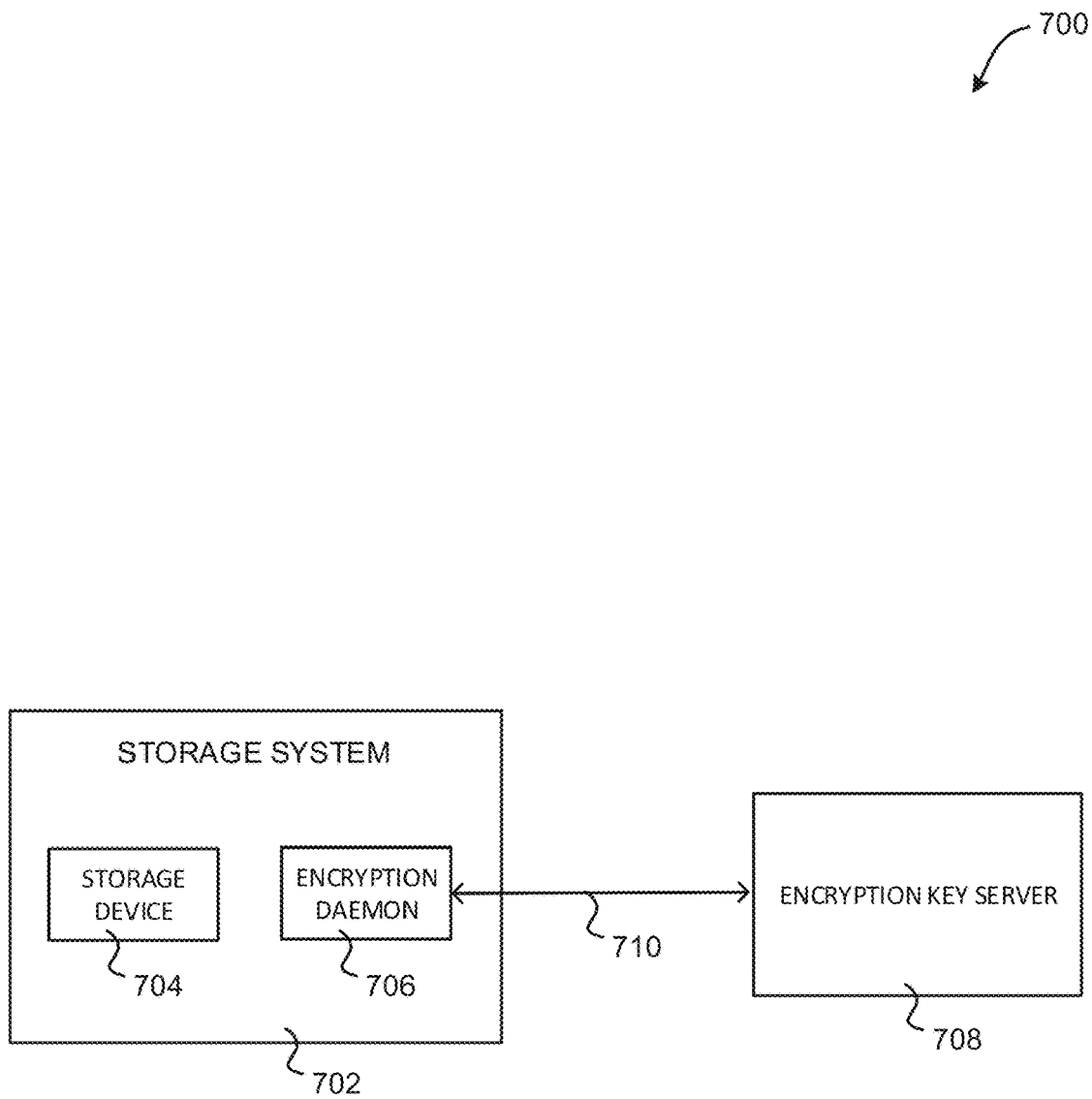
FIG. 7 illustrates an exemplary secure encryption key retrieval environment, in accordance with one embodiment of the present invention.

FIG. 7 illustrates an exemplary secure encryption key retrieval environment 700, according to one exemplary embodiment. As shown, a storage system 702 includes a storage device 704 as well as an encryption daemon 706. In one embodiment, the storage device 704 may include one or more physical tape drives (e.g., within a tape library, etc.), one or more disk cache controllers, etc. In another embodiment, the storage device 704 and the encryption daemon 706 may be connected via a hardwired connection, via an Ethernet connection that implements secure data transfer, etc.

Additionally, in one embodiment, the storage device 704 sends the encryption daemon 706 a key request. For example, the storage device 704 may need to read or write data in an encrypted manner, utilizing a predetermined encryption key. A request for this predetermined encryption key may be sent from the storage device 704 to the encryption daemon 706 over an encrypted or unencrypted connection within the storage system 702.

Further, in one embodiment, in response to receiving the key request from the storage device 704, the encryption daemon 706 implements a secure communications channel 710 between the encryption daemon and an encryption key server 708. In another embodiment, the encryption key server 708 may be one of a plurality of different encryption key servers separate from the storage system 702.

Further still, in one embodiment, the encryption daemon 706 may then encrypt the key request (e.g., utilizing a public key for the encryption key server 708) to create an encrypted request, and may send the encrypted request to the encryption key server 708, utilizing the secure communications channel 710. Upon receiving the encrypted request, the encryption key server 708 may decrypt the encrypted request (e.g., utilizing a private key for the encryption key server 708) to obtain the key request.

Also, in one embodiment, the encryption key server 708 may then retrieve the requested key, utilizing the encryption key server 708. The requested key may then be encrypted by the encryption key server 708 (e.g., utilizing a public key for the encryption daemon 706) to create an encrypted response. The encrypted response may then be sent to the encryption daemon 706, utilizing the secure communications channel 710.

In addition, in one embodiment, upon receiving the encrypted response, the encryption daemon 706 may decrypt the encrypted response (e.g., utilizing a private key for the encryption daemon 706) to obtain the requested encryption key. The requested encryption key may then be returned to the storage device 704 over an encrypted or unencrypted connection within the storage system 702. The storage device 704 may then use the requested encryption key to encrypt data to be written to the storage device 704, or to decrypt encrypted data to be read from the storage device 704.

Figure 8:
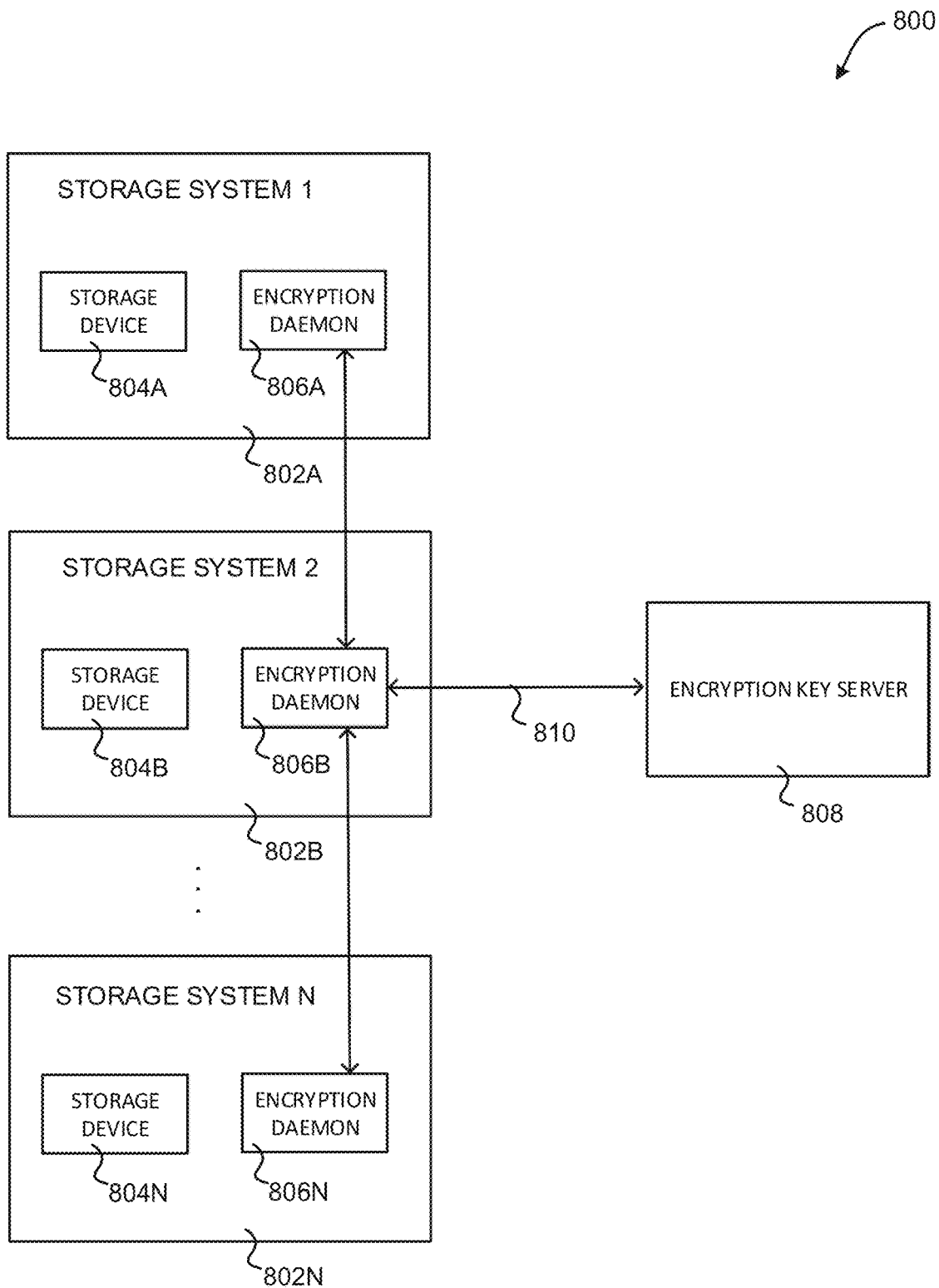
FIG. 8 illustrates an exemplary secure encryption key retrieval within a distributed storage environment, in accordance with one embodiment of the present invention.

FIG. 8 illustrates an exemplary secure encryption key retrieval within a distributed storage environment 800, according to one exemplary embodiment. As shown, a plurality of storage systems 802A-N each includes a respective storage device 804A-N as well as a respective encryption daemon 806A-N. The encryption daemons 806A-N communicate with each other using either a hardwired connection or an Ethernet connection that implements secure data transfer. Additionally, only the second encryption daemon 806B is capable of communicating with an encryption key server 808.

In one embodiment, each storage device 804A-N may include one or more physical tape drives (e.g., within a tape library, etc.), one or more disk cache controllers, etc. In another embodiment, each storage device 804A-N and its respective encryption daemon 806A-N may be connected via a hardwired connection, via an Ethernet connection that implements secure data transfer, etc.

Additionally, in one embodiment, a first storage device 804A sends a key request to a first encryption daemon 806A. For example, the first storage device 804A may need to read or write data in an encrypted manner, utilizing a predetermined encryption key. A request for this predetermined encryption key may be sent from the first storage device 804A to the first encryption daemon 806A over an encrypted or unencrypted connection within the first storage system 802A.

Further, in one embodiment, in response to receiving the key request from the first storage device 804, the first encryption daemon 806A relays the key request to the second encryption daemon 806B. For example, the first encryption daemon 806A may determine that it is unable to securely retrieve the requested key, and may then send the key request to the second encryption daemon 806B. In another embodiment, the first encryption daemon 806A may store metadata indicating that the second encryption daemon 806B is capable of communicating with the encryption key server 808.

Further still, in one embodiment, in response to receiving the key request from the first encryption daemon 806A, the second encryption daemon 806B implements a secure communications channel 810 between the encryption daemon and an encryption key server 808. In another embodiment, the encryption key server 808 may be one of a plurality of different encryption key servers separate from the storage systems 802A-N.

Further still, in one embodiment, the second encryption daemon 806B may then encrypt the key request (e.g., utilizing a public key for the encryption key server 808) to create an encrypted request, and may send the encrypted request to the encryption key server 808, utilizing the secure communications channel 810. Upon receiving the encrypted request, the encryption key server 808 may decrypt the encrypted request (e.g., utilizing a private key for the encryption key server 808) to obtain the key request.

Also, in one embodiment, the encryption key server 808 may then retrieve the requested key, utilizing the encryption key server 808. The requested key may then be encrypted by the encryption key server 808 (e.g., utilizing a public key for the second encryption daemon 806B) to create an encrypted response. The encrypted response may then be sent to the second encryption daemon 806B, utilizing the secure communications channel 810.

In addition, in one embodiment, upon receiving the encrypted response, the second encryption daemon 806B may decrypt the encrypted response (e.g., utilizing a private key for the second encryption daemon 806B) to obtain the requested encryption key. The requested encryption key may then be sent to the first encryption daemon 806A, and may be returned from the first encryption daemon 806A to the first storage device 804A over an encrypted or unencrypted connection within the first storage system 802A. The first storage device 804A may then use the requested encryption key to encrypt data to be written to the first storage device 804A, or to decrypt encrypted data to be read from the first storage device 804A.

Securing Network Communications Between Storage Devices and Encryption Key Servers for Data Encryption There is a current need for end to end data security in storage products. Before a tape drive or disk controller can perform encryption of data to be written to desired media, a key exchange must occur. For example, a tape drive or disk controller may request an encryption key from an external encryption key server. During this handshake, a series of messages flow between the tape drive/disk controller and the encryption key server. This conversation, which is transmitted over an Ethernet network, is currently not secure. This may lead to the compromise of the encryption key used to encrypt their data either on tape or on disk.

In one embodiment, an intermediator may be implemented between the storage devices and encryption key servers. When a storage device requires an encryption key to either write new data or read existing encrypted data, a key exchange may occur where the storage device initiates the key request to the encryption key server. A session is established between the storage device and the encryption key server, and a series of message exchanges are made in which by the end of the session, the storage device gets the encryption key.

In another embodiment, the intermediator listens for and intercepts key exchange requests coming from any storage device, verifies the identity of the encryption key server, establishes a secure network connection from the storage system to the encryption key server, and facilitates the encrypted conversation between a storage device and the encryption key server. Customers will be able to assign which encryption key servers to use per storage device basis.

The intermediator can implement secure sessions with multiple different encryption key servers.

Figure 9:
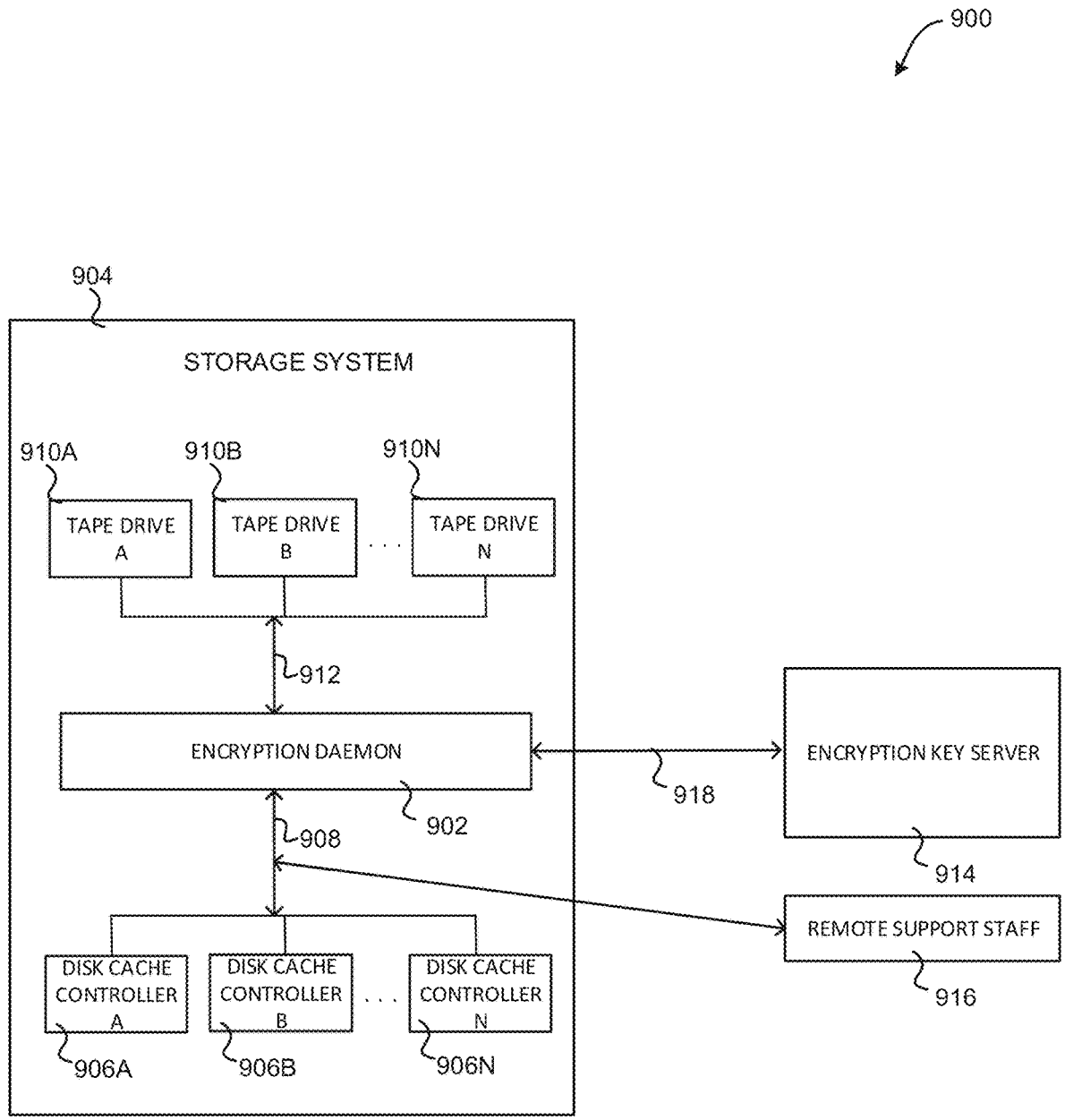
FIG. 9 illustrates an exemplary secure key retrieval environment, in accordance with one embodiment of the present invention.

FIG. 9 illustrates an exemplary secure key retrieval environment 900, according to one exemplary embodiment. As shown, an encryption daemon 902 includes a process running on the storage system 904 to receive commands from disk cache controllers 906A-N via an Ethernet network 908, and from physical tape drives 910A-N from a private fiber channel network 912. The disk cache controllers 906A-N and physical tape drives 910A-N will think they are talking to a real encryption key server 914 when they are really just talking to the encryption daemon 902.

Since the fiber channel network 912 that the physical tape drives 910A-N use to talk to the encryption daemon 902 is private and has no external connection, there is no need to secure the messages that flow among the components attached to this network. However, the Ethernet network 908 that connects the disk cache controllers 906A-N to the encryption daemon 902 does allow external host systems to connect such as those from remote support staff 916. This arrangement could allow someone that is connected to this Ethernet network 908 to listen in on the encryption key exchanges from the disk cache controllers 906A-N to the encryption daemon 902. Thus, the communications between the disk cache controllers 906A-N and the encryption daemon 902 are secured.

In order to secure the encryption key exchange requests from the disk cache controller 906A-N to the encryption daemon 902, each encryption daemon 902 will have its own public key certificate. In cryptography, a public key certificate, also known as a digital certificate or identity certificate, is an electronic document used to prove the ownership of a public key. The certificate includes information about the key, information about the identity of its owner (called the subject such as the disk cache controller 906A-N, the encryption daemon 902, or the physical tape drive 910A-N), and the digital signature of an entity that has verified the certificate's contents (called the issuer). If the signature is valid, and the software examining the certificate trusts the issuer, then it can use that key to communicate securely with the certificate's subject. The disk cache controllers 906A-N and the encryption daemon 902 will use the Transport Layer Security (TLS) as a way to secure the network communications. Each disk cache controller 906A-N will have a downloaded copy of the public key certificate that was issued for the encryption daemon 902 that they are physically attached to via the Ethernet Network 908.

When a disk cache controller 906A requires the encryption key, it initiates a connection request to the encryption daemon 902 on the Ethernet Network 908. During the connection setup, since the encryption daemon 902 is acting as the TLS server on this network connection, it will present its public key certificate to the disk cache controller 906A, The disk cache controller 906A (TLS client) will verify the validity of public key certificate by comparing information stored in that certificate with information from its key store which also has a copy of the encryption daemon's 902 public key certificate. Once the TLS server certificate has been validated by the TLS client, the connection is established and all future communications for this client/server connection will be encrypted.

In one embodiment, there may be two network paths where the encryption daemon 902 receives encryption key requests—the disk cache controllers 906A-N using the Ethernet network 908 and also the physical tape drives 910A-N via the fiber channel network 912. Since all encryption key requests must eventually go to the target encryption key server 914 using the customer Ethernet network 918, these network sessions must be secured. In order to do this, TLS will also be used. The encryption daemon 902 will now act as a TLS Client and the target encryption key server 914 will act as the TLS server. Therefore, the encryption daemon 902 will need a way download the public key certificate from the encryption key server 914. During the initial connection setup with the target encryption key server 914, the encryption daemon 902 will verify the identity of the encryption key server 914 before proceeding with the key exchange request. After the connection has been established, the entire key exchange session will be encrypted and secure.

In one embodiment, an interface may be provided that will allow a user to configure the encryption key server 914 IP address and TLS listener port. More than one encryption key server 914 can be configured.

The user can also specify which encryption key servers will be used for disk cache encryption and which ones to use for tape drive encryption.

In another embodiment, an interface may be used to add and store a public key certificate belonging to an encryption key server 914. For example, a web panel may include fields that allow a user to enter a "Host" or the IP address of the encryption key server 914 that will be used for key exchanges. On the same web panel, a "Port" field may allow entry of the port number that the encryption key server 914 is listening on. This same process may be repeated for each encryption key server 914 that will communicate with the encryption daemon 902. After this process, the encryption daemon 902 will be able to verify the identity of the encryption key server 914 and establish a secure connection for future encryption key exchanges.

In another embodiment, as a disk cache controller 906A-N or physical tape drive 910A-N initiates a secure connection to do an encryption key exchange, the encryption daemon 902 will accept the connection and create a thread to process the request. When a new requester requires an encryption key, a new secure connection may be established and the encryption daemon 902 may spawn another thread to handle the request.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for securely retrieving an encryption key, the method comprising:
   intercepting, by a second encryption daemon implemented within a second storage system, an unencrypted key request from a second storage device located within the second storage system;
   determining, by the second encryption daemon, that the second encryption daemon is unable to establish a secure communications channel between the second encryption daemon and an encryption key server for securely retrieving the requested key;
   identifying, by the second encryption daemon, metadata indicating that a first encryption daemon is capable of communicating with the encryption key server,
   wherein the first encryption daemon is implemented within a first storage system that is separate from the second storage system,
   wherein the first storage system and the second storage system are included within a storage matrix;
   sending the unencrypted key request from the second encryption daemon to the first encryption daemon, utilizing a hardwired connection between the second encryption daemon and the first encryption daemon;
   encrypting, by the first encryption daemon, the unencrypted key request to create an encrypted key request;
   sending the encrypted key request from the first encryption daemon to the encryption key server, utilizing a secure communications channel;
   receiving, from the encryption key server at the first encryption daemon, an encrypted response, utilizing the secure communications channel;
   decrypting, by the first encryption daemon, the encrypted response to obtain the requested key; and
   sending the requested key from the first encryption daemon to the second encryption daemon,
   wherein the encryption key server is assigned from a plurality of encryption key servers for retrieving the requested key based on the second storage device.

2. The computer-implemented method of claim 1 wherein the second encryption daemon is implemented within a same enclosure as the second storage device.

3. The computer-implemented method of claim 1, wherein the second storage device includes a disk cache controller that controls data writes and reads to one or more hardware storage drives.

4. The computer-implemented method of claim 1, wherein the first encryption daemon has a public key certificate corresponding to a public key, wherein communications between a first storage device and the first encryption daemon within the first storage system are encrypted.

5. The computer-implemented method of claim 1, wherein the first storage system comprises a third storage device in communication with the first encryption daemon via a private network having no connection to devices external to the first storage system; and comprising:
   intercepting, by the first encryption daemon, a second key request sent from the third storage device via the private network, wherein an intended destination of the second key request is the encryption key server located outside the first storage system;
   establishing, by the first encryption daemon, the secure communications channel between the first storage system and the encryption key server;
   sending, by the first encryption daemon, the second key request to the encryption key server, utilizing the secure communications channel;
   receiving, from the encryption key server at the first encryption daemon, a second encrypted response from the encrypted key server, utilizing the secure communications channel;
   decrypting, by the first encryption daemon, the encrypted response to obtain the requested key; and
   sending the requested key from the first encryption daemon to the third storage device in unencrypted form.

6. The computer-implemented method of claim 5, wherein the private network is a fiber channel network.

7. The computer-implemented method of claim 1, comprising:
   intercepting, by the first encryption daemon, a second key request from the second encryption daemon;
   implementing, by the first encryption daemon, the secure communications channel between the first storage system and the encryption key server;
   sending the second key request from the first encryption daemon to the encryption key server, utilizing the secure communications channel;
   receiving, from the encryption key server at the first encryption daemon, an encrypted second response, utilizing the secure communications channel;
   decrypting, by the first encryption daemon, the encrypted second response to obtain the requested second key; and
   sending the requested second key from the first encryption daemon to the second encryption daemon, wherein the second encryption daemon provides the second key to the second storage device, located within the second storage system, that requested the key.

8. The computer-implemented method of claim 7, wherein the first encryption daemon has a first public key certificate, and the second encryption daemon has a second public key certificate separate from the first public key certificate.

9. The computer-implemented method of claim 7, wherein the first encryption daemon is implemented within a same enclosure as a first storage device, wherein the second encryption daemon is implemented within a same second enclosure as the second storage device that sent the unencrypted key request.

10. The computer-implemented method of claim 7, wherein:
    the first storage system includes a disk cache controller, and implementing the secure communications channel includes spawning, by the first encryption daemon, a new thread to manage the unencrypted key request, wherein the new thread manages a security handshake with the encryption key server as well as the receipt of the encrypted response from the encryption key server.

11. The computer-implemented method of claim 1, wherein the first encryption daemon stores public key certificates for a plurality of different encryption key servers.

12. The computer-implemented method of claim 1, wherein implementing the secure communications channel includes performing, by the first encryption daemon, a Transport Layer Security (TLS) handshake with the encryption key server.

13. The computer-implemented method of claim 1, wherein the first encryption daemon: verifies an identity of the encryption key server prior to requesting the key, and encrypts the unencrypted key request to create the encrypted key request utilizing a public key for the encryption key server.

14. The computer-implemented method of claim 1, wherein the first encryption daemon decrypts the encrypted response utilizing a private key corresponding to a public key used to encrypt the encrypted response.

15. The computer-implemented method of claim 1, wherein: the first encryption daemon runs on a standalone device within the first storage system, the encrypted response includes the requested key that has been encrypted by the encryption key server, and the first encryption daemon decrypts the encrypted response to obtain the requested key.

16. A computer-implemented method, comprising:
intercepting, by a first encryption daemon implemented within a storage system, a key request sent from a storage device located within the storage system, wherein an intended destination of the key request is an encryption key server that is outside the storage system;
implementing, by the first encryption daemon, a secure communications channel between the storage system and the encryption key server;
sending, by the first encryption daemon, the key request to the encryption key server, utilizing the secure communications channel;
receiving, from the encryption key server at the first encryption daemon, an encrypted response, utilizing the secure communications channel;
decrypting, by the first encryption daemon, the encrypted response to obtain the requested key;
sending the requested key from the first encryption daemon to the storage device,
wherein the storage device thinks it is communicating with the encrypted key server during performance of the method;
intercepting, by the first encryption daemon, a second key request from a second encryption daemon implemented within a second storage system that is remote from the storage system, wherein the second key request is received by the first encryption daemon in response to determining, by the second encryption daemon, that the second encryption daemon is unable to establish the secure communications channel between the second encryption daemon and the encryption key server for securely retrieving the requested key;
implementing, by the first encryption daemon, the secure communications channel between the storage system and the encryption key server;
sending the second key request from the first encryption daemon to the encryption key server, utilizing the secure communications channel;
receiving, from the encryption key server at the first encryption daemon, an encrypted second response, utilizing the secure communications channel;
decrypting, by the first encryption daemon, the encrypted second response to obtain the requested second key; and
sending the requested second key from the first encryption daemon to the second encryption daemon, wherein the second encryption daemon provides the second key to a second storage device, located within the second storage system, that requested the key, wherein: the storage system and the second storage system are included within a storage matrix, the second key request is received from the second encryption daemon using a hardwired connection between the first encryption daemon and the second encryption daemon, the first encryption daemon requests and obtains public keys for each of a plurality of different encryption key servers in response to determining that the first encryption daemon is in communication with the plurality of different encryption key servers, implementing the secure communications channel includes spawning, by the first encryption daemon, a new thread to manage the key request, wherein the new thread manages a security handshake with the encryption key server as well as the receipt of the encrypted response from the encryption key server, the encrypted response includes the requested key that has been encrypted by the encryption key server, the first encryption daemon decrypts the encrypted response to obtain the requested key, the first encryption daemon is implemented within a same enclosure as the storage device, and the storage device includes a disk cache controller that controls data writes and reads to one or more hardware storage drives.

17. A computer program product comprising one or more computer readable storage media, and program instructions collectively stored on the one or more computer readable storage media, the program instructions comprising instructions configured to cause one or more processors to perform a method comprising:
intercepting, by a second encryption daemon implemented within a second storage system, an unencrypted key request from a second storage device located within the second storage system;
determining, by the second encryption daemon, that the second encryption daemon is unable to establish a secure communications channel between the second encryption daemon and an encryption key server for securely retrieving the requested key;
identifying, by the second encryption daemon, metadata indicating that a first encryption daemon is capable of communicating with the encryption key server, wherein the first encryption daemon is implemented within a first storage system that is separate from the second storage system, wherein the first storage system and the second storage system are included within a storage matrix;
sending the unencrypted key request from the second encryption daemon to the first encryption daemon, utilizing a hardwired connection between the second encryption daemon and the first encryption daemon;
encrypting, by the first encryption daemon utilizing the one or more processors, the unencrypted key request to create an encrypted key request;
sending, by the one or more processors, the encrypted key request from the first encryption daemon to the encryption key server, utilizing the secure communications channel;
receiving, from the encryption key server at the first encryption daemon utilizing the one or more processors, an encrypted response, utilizing the secure communications channel;
decrypting, by the first encryption daemon utilizing the one or more processors, the encrypted response to obtain the requested key; and
sending, by the one or more processors, the requested key from the first encryption daemon to the second encryption daemon.

18. The computer program product of claim 17, wherein the encryption key server is assigned from a plurality of encryption key servers for retrieving the requested key based on the second storage device.

19. The computer program product of claim 17, wherein: the second encryption daemon stores metadata indicating that the first encryption daemon is capable of communicating with the encryption key server, and the second encryption daemon sends the key request to the first encryption daemon in response to determining that the second encryption daemon is unable to establish a secure communications channel with the encryption key server.

* * * * *